US012026898B2

(12) United States Patent
Qu

(10) Patent No.: US 12,026,898 B2
(45) Date of Patent: Jul. 2, 2024

(54) SYSTEMS AND METHODS FOR IMAGE FUSION

(71) Applicant: ZHEJIANG DAHUA TECHNOLOGY CO., LTD., Zhejiang (CN)

(72) Inventor: Erping Qu, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 538 days.

(21) Appl. No.: 17/330,359

(22) Filed: May 25, 2021

(65) Prior Publication Data
US 2021/0279530 A1 Sep. 9, 2021

Related U.S. Application Data

(63) Continuation of application No. PCT/CN2018/124167, filed on Dec. 27, 2018.

(51) Int. Cl.
*G06K 9/62* (2022.01)
*G06F 18/2431* (2023.01)
(Continued)

(52) U.S. Cl.
CPC ............ *G06T 7/33* (2017.01); *G06F 18/2431* (2023.01); *G06F 18/254* (2023.01); *G06T 5/50* (2013.01);
(Continued)

(58) Field of Classification Search
CPC ... G06T 7/33; G06T 5/50; G06T 2207/10048; G06T 2207/30232; G06T 2207/20221;
(Continued)

(56) References Cited

U.S. PATENT DOCUMENTS 8,547,456 B1 10/2013 Zimmerman et al.
9,686,537 B2 6/2017 Geiss et al.
(Continued)

FOREIGN PATENT DOCUMENTS

CN 103679670 A 3/2014
CN 103679677 A 3/2014
(Continued)

OTHER PUBLICATIONS

Soumya et al., "Recolorizing dark regions to enhance night surveillance video", Multimed Tools Appl (2017) (Year: 2017).*
(Continued)

*Primary Examiner* — Mekonen T Bekele
(74) *Attorney, Agent, or Firm* — METIS IP LLC

(57) ABSTRACT

A method for image fusion may include obtaining a first image including a plurality of first pixels and a second image including a plurality of second pixels. Each of the plurality of second pixels may correspond to one of the plurality of first pixels. The method may further include classifying the plurality of first pixels into different categories which at least includes a first category and a second category. The method may further include fusing the first image with the second image based on a fusion operation between each of the plurality of first pixels and its corresponding second pixel to generate a fused image. The fusion operation associated with a first pixel belonging to the first category and the fusion operation associated with a first pixel belonging to the second category are performed according to different fusion rules.

14 Claims, 9 Drawing Sheets

(51) Int. Cl.
  *G06F 18/25* (2023.01)
  *G06T 5/50* (2006.01)
  *G06T 7/33* (2017.01)
  *G06V 10/143* (2022.01)
  *G06V 10/80* (2022.01)
  *G06V 20/52* (2022.01)

(52) U.S. Cl.
  CPC ............ *G06V 10/143* (2022.01); *G06V 10/80* (2022.01); *G06V 20/52* (2022.01); *G06T 2207/10048* (2013.01); *G06T 2207/20221* (2013.01)

(58) Field of Classification Search
  CPC .... G06F 18/2431; G06F 18/254; G06F 18/25; G06V 10/143; G06V 10/80; G06V 20/52
  See application file for complete search history.

(56) References Cited

U.S. PATENT DOCUMENTS

| | | | |
|---|---|---|---|
| 9,894,298 | B1 | 2/2018 | Solh |
| 2010/0127171 | A1 | 5/2010 | Jonsson et al. |
| 2015/0325021 | A1* | 11/2015 | Lee ........................ G06T 5/50 |
| | | | 382/274 |
| 2018/0315220 | A1 | 11/2018 | Magalotti et al. |
| 2019/0213723 | A1 | 7/2019 | Luo et al. |

FOREIGN PATENT DOCUMENTS

| | | |
|---|---|---|
| CN | 106952245 B | 4/2018 |
| CN | 108335279 A | 7/2018 |
| EP | 2775719 B1 | 9/2016 |

OTHER PUBLICATIONS

International Search Report in PCT/CN2018/124167 dated Sep. 27, 2019, 4 pages.
Written Opinion in PCT/CN2018/124167 dated Sep. 27, 2019, 4 pages.
The Extended European Search Report in European Application No. 18944695.8 dated Oct. 28, 2021, 10 pages.
Soumya T. et al., Recolorizing Dark Regions to Enhance Night Surveillance Video, Multimed Tools Appl, 76(22): 24477-24493, 2016.

* cited by examiner

500

510 Obtaining a first image and a second image, wherein the first image and the second image represent a same scene and be captured by different imaging channels

520 Classifying the pixels in the first image into different categories, the different categories at least including a first category and a second category

530 Fusing the first image with the second image based on a fusion operation between each of the plurality of first pixels and its corresponding second pixel to generate a fused image

FIG. 5

SYSTEMS AND METHODS FOR IMAGE FUSION

CROSS-REFERENCE TO RELATED APPLICATIONS

This application is a Continuation of International Application No. PCT/CN2018/124167, filed on Dec. 27, 2018, the entire contents of which are hereby incorporated by reference.

TECHNICAL FIELD

The present disclosure generally relates to methods, systems, and media for image fusion. More particularly, the present disclosure relates to methods, systems, and media for fusing a visible light image and an infrared light image.

BACKGROUND

Visible light image has been widely used in a security and surveillance system. Generally, a visible light image is generated by capturing the reflected visible light of an object included in a scene. The reflected visible light of the object may indicate related information of the object. However, under a low luminance condition, a lot of noises may be included in the visible light image and thus reduce the quality of the visible light image. To solve this problem, an infrared light image captured based on infrared light reflection may be used instead of the visible light image. The infrared light image may include less noise under the low luminance condition than the visible light image. However, the quality of the infrared light image may be affected by the material and/or the color of the object(s) in the scene. Therefore, it is desired to fuse the visible light image and the infrared light image to provide a high-quality image under the low luminance condition.

SUMMARY

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

According to an aspect of the present disclosure, a system for image fusion is provided. The system may include at least one storage medium storing a set of instructions and at least one processor configured to communicate with the at least one storage medium. When executing the set of instructions, the at least one processor may be directed to cause the system to obtain a first image including a plurality of first pixels. The first image may be generated by a first imaging channel. The at least one processor may be further directed to cause the system to obtain a second image including a plurality of second pixels. The second image may be generated by a second imaging channel distinct from the first imaging channel. Each of the plurality of second pixels may correspond to one of the plurality of first pixels. The at least one processor may be further directed to cause the system to classify the plurality of first pixels into different categories which at least includes a first category and a second category. The at least one processor may be further directed to cause the system to fuse the first image with the second image based on a fusion operation between each of the plurality of first pixels and its corresponding second pixel to generate a fused image, wherein the fusion operation associated with a first pixel belonging to the first category and the fusion operation associated with a first pixel belonging to the second category are performed according to different fusion rules.

In some embodiments, the first imaging channel may be configured to capture a visible light image, and the second imaging channel may be configured to capture an infrared light image.

In some embodiments, the first category may at least include a white point or a point approximate to the white point.

In some embodiments, the second category may at least include a non-white point.

In some embodiments, to perform the fusion operation associated with the first pixel belonging to the first category, the at least one processor may be directed to cause the system to determine a chrominance component of the first pixel belonging to the first category. The at least one processor may be also directed to cause the system to designate the chrominance component of the first pixel belonging to the first category as a chrominance component of a third pixel in the fused image.

In some embodiments, the at least one processor may be further directed to cause the system to generate a first binary image based on the first pixels belonging to the first category and the first pixels belonging to the second category. The at least one processor may be further directed to cause the system to perform a convolution operation on the first image and the first binary image such that the chrominance component of the first pixel belonging to the first category remains unchanged.

In some embodiments, to perform the fusion operation associated with the first pixel belonging to the second category, the at least one processor may be directed to cause the system to determine a chrominance component of the first pixel belonging to the second category. The at least one processor may be further directed to cause the system to determine a chrominance enhancement coefficient. The at least one processor may be further directed to cause the system to determine a chrominance component of a fourth pixel in the fused image based on the chrominance component of the first pixel belonging to the second category and the chrominance enhancement coefficient.

In some embodiments, the chrominance enhancement coefficient may be determined based on a luminance component of the first pixel belonging to the second category and a luminance component of a second pixel that corresponds to the first pixel belonging to the second category.

In some embodiments, the at least one processor may be directed to cause the system to generate a second binary image based on the first pixels belonging to the first category and the first pixels belonging to the second category. The at least one processor may be directed to cause the system to perform a convolution operation on the first image and the second binary image such that the chrominance component of the first pixel belonging to the second category remains unchanged.

In some embodiments, to perform the fusion operation associated with the first pixel belonging to the first category, the at least one processor may be directed to cause the system to determine a luminance of the first pixel belonging to the first category and a luminance of a second pixel that corresponds to the first pixel belonging to the first category.

The at least one processor may be further directed to cause the system to determine a luminance component of a fifth pixel in the fused image based on a comparison result between the luminance of the first pixel belonging to the first category and the luminance of the second pixel that corresponds to the first pixel belonging to the first category.

According to another aspect of the present disclosure, a method for image fusion is provided. The method may include obtaining a first image including a plurality of first pixels. The first image may be generated by a first imaging channel. The method may also include obtaining a second image including a plurality of second pixels. The second image may be generated by a second imaging channel distinct from the first imaging channel. Each of the plurality of second pixels may correspond to one of the plurality of first pixels. The method may further include classifying the plurality of first pixels into different categories which at least includes a first category and a second category. The method may still include fusing the first image with the second image based on a fusion operation between each of the plurality of first pixels and its corresponding second pixel to generate a fused image, wherein the fusion operation associated with a first pixel belonging to the first category and the fusion operation associated with a first pixel belonging to the second category are performed according to different fusion rules.

According to still another aspect of the present disclosure, a system for image acquisition is provided. The system may include at least one storage medium storing a set of instructions and at least one processor configured to communicate with the at least one storage medium. When executing the set of instructions, the at least one processor may be directed to cause the system to obtain a first image including a plurality of first pixels. The first image may be generated by a first imaging channel. The at least one processor may be further directed to cause the system to obtain a second image including a plurality of second pixels. The second image may be generated by a second imaging channel distinct from the first imaging channel. Each of the plurality of second pixels may correspond to one of the plurality of first pixels. The at least one processor may be further directed to cause the system to classify the plurality of first pixels into different categories which at least includes a first category and a second category. The at least one processor may be further directed to cause the system to fuse the first image with the second image based on a fusion operation between each of the plurality of first pixels and its corresponding second pixel to generate a fused image, wherein the fusion operation associated with a first pixel belonging to the first category and the fusion operation associated with a first pixel belonging to the second category are performed according to different fusion rules.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 is a flowchart illustrating an exemplary process for generating a fused image according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "unit," "module," and/or "engine" used herein are one method to distinguish different components, elements, parts, section or assembly of different level in ascending order. However, the terms may be displaced by other expression if they may achieve the same purpose.

Figure 2:
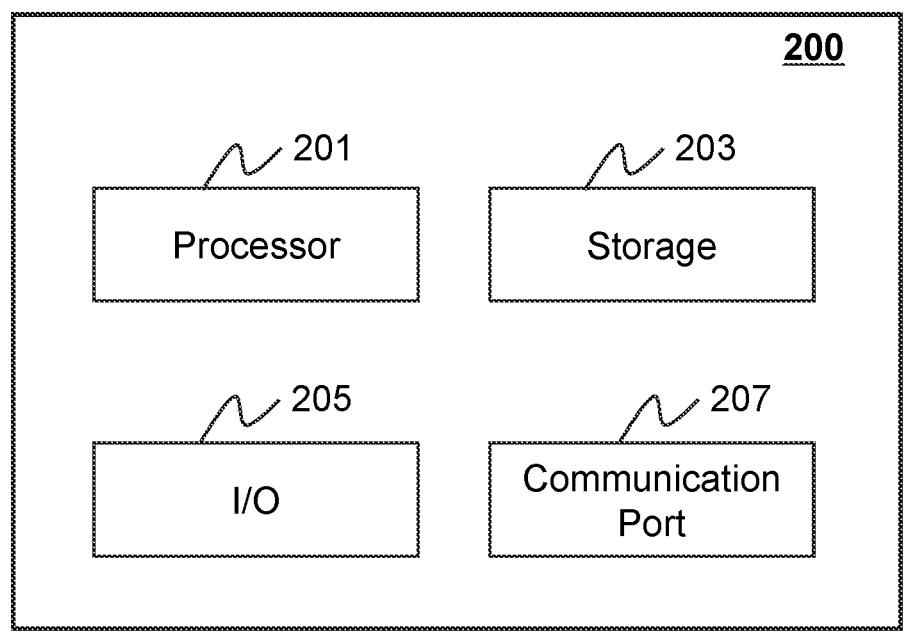
FIG. 2 is a schematic diagram illustrating exemplary hardware and software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, module or engine is referred to as being "on," "connected to" or "coupled to" another unit, module, or engine, it may be directly on, connected or coupled to, or communicate with the other unit, module, or engine, or an intervening unit, module, or engine may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Figure 1:
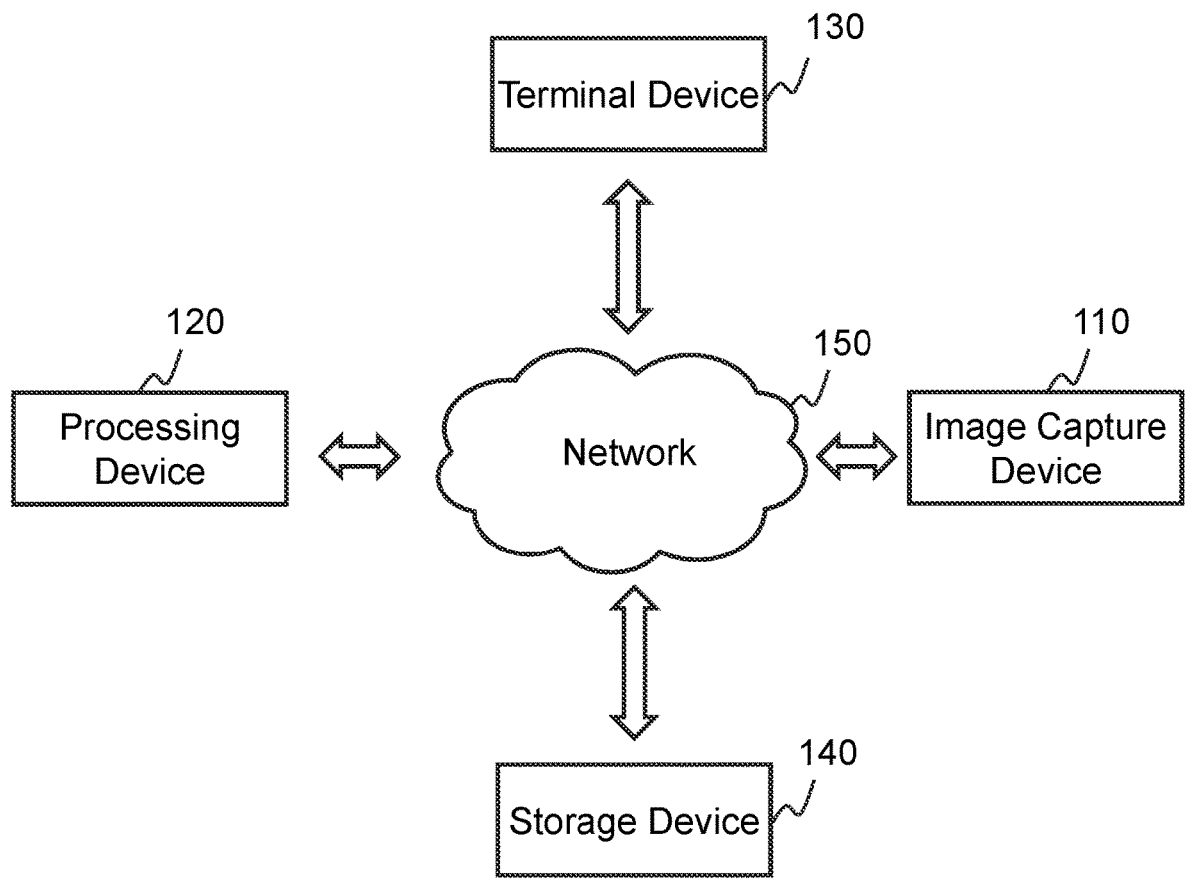
FIG. 1 is a schematic diagram illustrating an exemplary image fusion system according to some embodiments of the present disclosure.

FIG. 1 is a schematic diagram illustrating an exemplary image fusion system 100 according to some embodiments of the present disclosure. The image fusion system 100 may include an image capturing device 110, a processing device 120, a terminal device 130, a storage device 140, a network 150, and/or any other suitable component for image processing in accordance with various embodiments of the disclosure.

The image capturing device 110 may be used to acquire images. The acquired images may include a still image, a motion image, a video (offline or live streaming), a frame of a video, or the like, or a combination thereof. In some embodiments, the acquired images may include different types of images. Exemplary types of images may include a visible light image, an infrared light image, or the like, or a combination thereof. In some embodiments, the image capturing device 110 may have different imaging channels that can capture the different types of images that corresponds to a same scene (e.g., a same static scene or a same dynamic scene). For example, two imaging channels of the image capturing device 110 may capture the visible light image and the infrared light image, respectively. The visible light image and the infrared light image may be captured simultaneously or sequentially.

The image capturing device 110 may be any suitable device that is capable of capturing an image. The image capturing device 110 may be and/or include a camera, a sensor, a video recorder, or the like, or any combination thereof. The image capturing device 110 may be and/or include any suitable type of camera, such as a fixed camera, a fixed dome camera, a covert camera, a Pan-Tilt-Zoom (PTZ) camera, a thermal camera, etc. The image capturing device 110 may be and/or include any suitable type of sensor, such as an audio sensor, a light sensor, a wind speed sensor, or the like, or a combination thereof.

In some embodiments, a light sensor (e.g., a visible light detector, an infrared detector, etc.) may detect a light signal, such as a visible light signal, an infrared light signal. The images generated based on different light signals may include different information. For example, a visible light image generated based on a visible light signal may provide a high-resolution visible light image. An infrared light image generated based on an infrared light signal may provide luminance information distinct from the visible light image.

Data obtained by the image capturing device 110 (e.g., images, light signals, etc.) may be stored in the storage device 140, sent to the processing device 120 or the terminal device 130 via the network 150. In some embodiments, the image capturing device 110 may be integrated in the terminal device 130.

The processing device 120 may process images and/or data relating to one or more functions described in the present disclosure. For example, the processing device 120 may process images received from the image capturing device 110 and output processed images to the storage device 140 and/or the terminal device 130 through the network 150. In some embodiments, the processing device 120 may fuse images acquired by the image capturing device 110 by using different image fusion algorithms according to the types of the images. For example, the processing device 120 may use a luminance enhance fusion algorithm to fusing a visible light image and an infrared light image. Further, the processing device 120 may adjust one or more parameters of an image fusion algorithm (e.g. a luminance enhance coefficient and a chrominance enhancement coefficient) according to the scenes included in the images to be fused. For example, the processing device 120 may use a greater luminance enhancement coefficient to fuse a visible light image and an infrared light image captured in a low luminance environment (e.g. in a dark environment) than that in a low visibility environment (e.g. in a foggy weather). In some embodiments, the processing device 120 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof. In some embodiments, the processing device 120 may be integrated in the terminal device 130.

The terminal device 130 may receive, output, display, and/or process images. For example, the terminal device 130 may receive images from the image capturing device 110, the processing device 120, the storage device 140, the network 150, etc. As another example, the terminal device 130 may output or display a visible light image and/or an infrared light image received from the image capturing device 110 and/or a fused image received from the processing device 120 via the network 150 to a user. As another example, the terminal device 130 may process images received from the image capturing device 110, the processing device 120, the storage device 140, the network 150, etc.

The terminal device 130 may be connected to or communicate with the processing device 120. The terminal device 130 may allow one or more operators (e.g., a law enforcement officer, etc.) to control the production and/or display of the data (e.g., the image captured by the image capturing device 110) on a display. The terminal device 130 may include an input device, an output device, a control panel, a display (not shown in FIG. 1), or the like, or a combination thereof.

An input device may be a keyboard, a touch screen, a mouse, a remote controller, a wearable device, or the like, or a combination thereof. The input device may include alphanumeric and other keys that may be inputted via a keyboard, a touch screen (e.g., with haptics or tactile feedback, etc.), a speech input, an eye tracking input, a brain monitoring system, or any other comparable input mechanism. The input information received through the input device may be communicated to the processing device 120 via the network 150 for further processing. Another type of the input device may include a cursor control device, such as a mouse, a trackball, or cursor direction keys to communicate direction information and command selections to, for example, the processing device 120 and to control cursor movement on display or another display device.

A display may display the data received (e.g., the image captured by the image capturing device 110). The information may include data before and/or after data processing, a request for input or parameter relating to image acquisition and/or processing, or the like, or a combination thereof. The display may include a liquid crystal display (LCD), a light emitting diode (LED)-based display, a flat panel display or curved screen (or television), a cathode ray tube (CRT), or the like, or a combination thereof.

The storage device 140 may acquire and/or store information of the components (e.g., the image capturing device 110, the processing device 120, or the terminal device 130, etc.) of the image fusion system 100. For example, the storage device 140 may acquire and store images from the processing device 120. In some embodiments, the information acquired and/or stored may include programs, software, algorithms, functions, files, parameters, data, texts, numbers, images, or the like, or any combination thereof. In some embodiments, the storage device 140 may store visible light images and/or infrared light images received from the image capturing device 110 and fused images received from the processing device 120 with different formats including, for example, bmp, jpg, png, tiff, gif, pcx, tga, exif, fpx, svg, psd, cdr, pcd, dxf, ufo, eps, ai, raw, WMF, or the like, or any combination thereof. In some embodiments, the storage device 140 may store algorithms (e.g., a haze removal algorithm, a guided filter algorithm, etc.) applied in the processing device 120. In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary mass storage may include a magnetic disk, an optical disk, a solid-state drives, etc.

The network 150 may facilitate exchange of information. In some embodiments, one or more components in the image fusion system 100 (e.g., the image capturing device 110, the terminal device 130, the processing device 120 and the storage device 140) may send information to other component(s) in the image fusion system 100 via the network 150. For example, the storage device 140 may receive and store a visible light and/or an infrared light image via the network 150. In some embodiments, the network 150 may be any type of a wired or wireless network, or a combination thereof. Merely by way of example, the network 150 may include a cable network, a wire line network, an optical fiber network, a telecommunication network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof.

It should be noted that the description above in relation to the image fusion system 100 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, the image capturing device 110 may be integrated in the terminal device 130. In some embodiments, part or all of the image data generated by the image capturing device 110 may be processed by the terminal device 130. In some embodiments, the image capturing device 110 and the processing device 120 may be implemented in one single device configured to perform the functions of the image capturing device 110 and the processing device 120 described in this disclosure. In some embodiments, the terminal device 130 and the storage device 140 may be part of the processing device 120 as a single device. Similar modifications should fall within the scope of the present disclosure.

FIG. 2 is a schematic diagram illustrating exemplary hardware and/or software components of a computing device on which the image capturing device 110, the processing device 120, or the terminal device 130 may be implemented according to some embodiments of the present disclosure. As illustrated in FIG. 2, the computing device 200 may include a processor 201, a storage 203, an input/output (I/O) 205, and a communication port 207.

The processor 201 may execute computer instructions (program code) and perform functions of the processing device in accordance with techniques described herein. The computer instructions may include routines, programs, objects, components, signals, data structures, procedures, modules, and functions, which perform particular functions described herein. For example, the processing device 120 may be implemented on the computing device 200 and the processor 201 may generate a fused image based on a visible light image and an infrared light image. In some embodiments, the processor 201 may include a microcontroller, a microprocessor, a reduced instruction preset computer (RISC), an application specific integrated circuits (ASICs), an application-specific instruction-preset processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration purposes, only one processor is described in the computing device 200. However, it should be note that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., a first processor executes step A and a second processor executes step B, or the first and second processors jointly execute steps A and B).

The storage 203 may store data/information obtained from any other component of the computing device 200 (e.g., the processor 201). In some embodiments, the storage 203 may include a mass storage device, a removable storage device, a volatile read-and-write memory, a read-only memory (ROM), or the like, or any combination thereof. For example, the mass storage device may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random-access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 203 may store one or more programs and/or instructions to perform exemplary methods described in the present disclosure. For example, the storage 203 may store a program for generating a fused image based on a visible light image and an infrared light image. As another example, the storage 203 may store images captured by the image capturing device 110.

The I/O 205 may input or output signals, data, or information. In some embodiments, the I/O 205 may enable a user interaction with the processing device. For example, a captured image may be displayed through the I/O 205. In some embodiments, the I/O 205 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 207 may be connected to a network to facilitate data communications. The communication port 207 may establish connections between the computing device 200 and an external device (e.g., a smart phone). The connection may be a wired connection, a wireless connection, or combination of both that enables data transmission and reception. The wired connection may include an electrical cable, an optical cable, a telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 207 may be a standardized communication port, such as RS232, RS485, etc.

Figure 3:
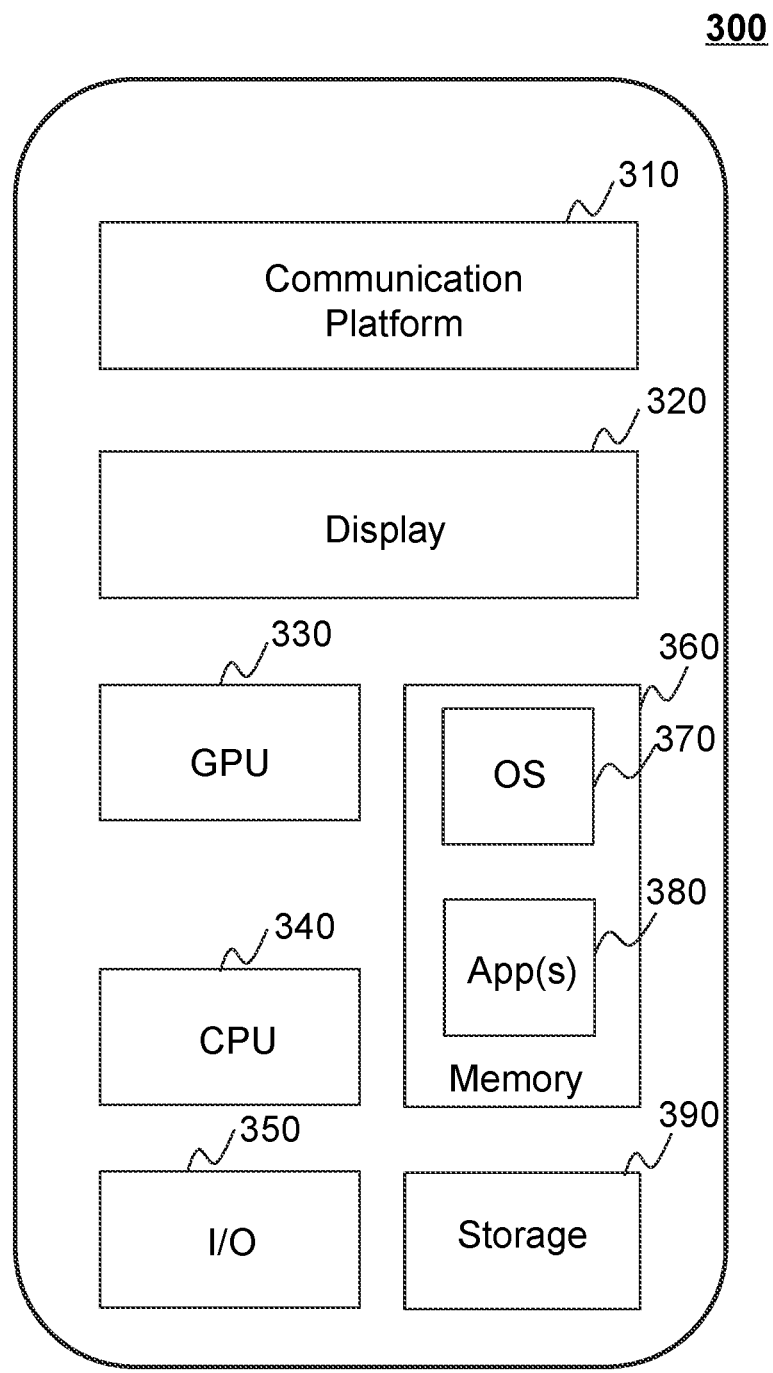
FIG. 3 is a schematic diagram illustrating exemplary hardware and software components of a mobile device according to some embodiments of the present disclosure.

FIG. 3 is a schematic diagram illustrating exemplary hardware and/or software components of a mobile device on which the image capturing device 110, the processing device 120, or the terminal device 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to transportation services or other information from the processing device 120. User interactions with the information stream may be achieved via the I/O 350 and provided to the processing device 120 and/or other components of the image fusion system 100 via the network 150.

Hence, aspects of the methods of the image processing and/or other processes, as described herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a scheduling system into the hardware platform(s) of a computing environment or other system implementing a computing environment or similar functionalities in connection with image processing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s), or the like, which may be used to implement the system or any of its components shown in the drawings. Volatile storage media may include dynamic memory, such as main memory of such a computer platform. Tangible transmission media may include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media may include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described herein may be embodied in a hardware device, it may also be implemented as a software only solution (e.g., an installation on an existing server). In addition, image processing as disclosed herein may be implemented as firmware, a firmware/software combination, a firmware/hardware combination, or a hardware/firmware/software combination.

Figure 4:
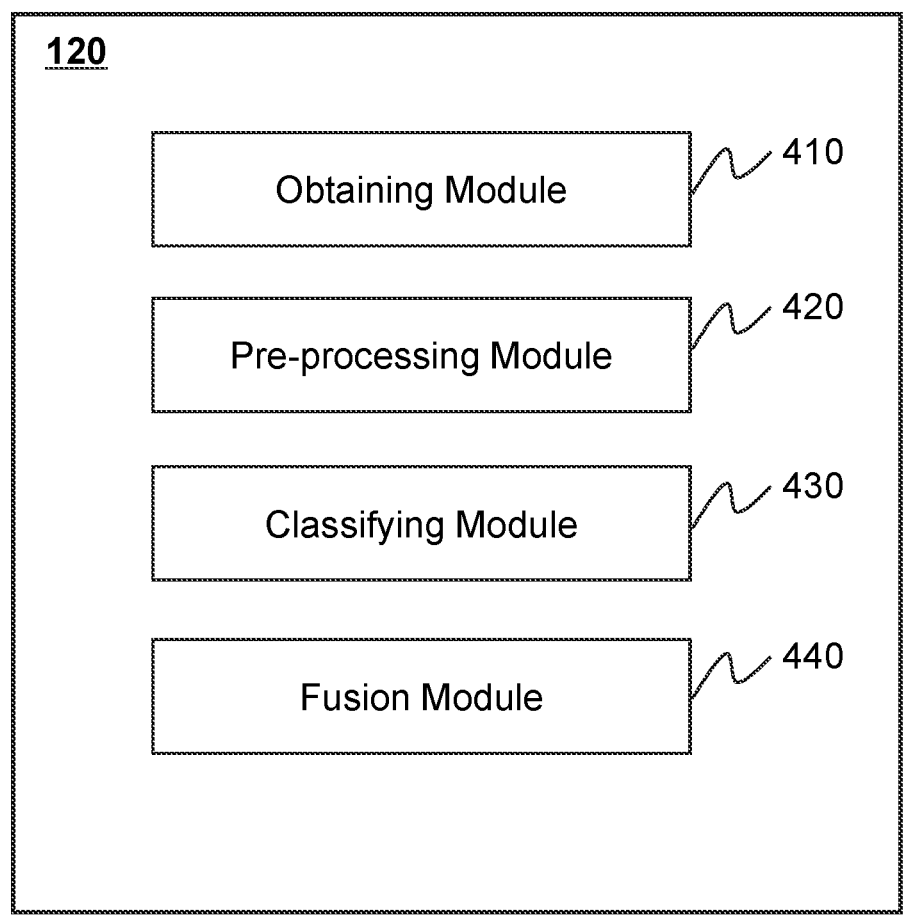
FIG. 4 is a schematic diagram illustrating an exemplary processing device according to some embodiments of the present disclosure.

FIG. 4 is a schematic diagram illustrating an exemplary processing device according to some embodiments of the present disclosure. The processing device 120 may include an obtaining module 410, a pre-processing module 420, a classifying module 430 and a fusion module 440.

The obtaining module 410 may be configured to obtain a first image and a second image. The first image and the second image may represent a same scene. For example, both of the first image and the second image may show a same object with the same surroundings. The first image and the second image may be captured by different imaging channels. In some embodiments, the different imaging channels may be represented by different image capturing devices, such as visible light camera and an infrared light camera. In some embodiments, the different imaging channels may be represented by different image sensors in a same image capturing device (e.g., the image capturing device 110), such as a visible light sensor and an infrared sensor. In some embodiments, the different imaging channels may be represented by different working states of an image capturing device (e.g., the image capturing device 110), such as a visible light capturing state and an infrared light capturing state.

The pre-processing module 420 may be configured to perform a pre-processing operation on one or more images. Exemplary preprocessing may include reducing the noise by, for example, a filtering operation. The filtering operation may include a spatial filtering, a frequency domain filtering, or the like, or a combination thereof. The spatial filtering may include linear filtering (e.g., a mean filtering, a Gaussian filtering, a Wiener filtering) and non-linear filtering (e.g., a median filtering). Specifically, the first image and/or the second image obtained by the obtaining module 410 may be the pre-processed image pre-processed by an enhanced time-domain noise reduction algorithm. The enhanced time-domain noise reduction algorithm may remove jittered color noises in the original image of the first image and/or the second image. The jittered color noises may be an abnormal color change caused by, for example, a hardware problem. Under low luminance environments, jittered color noises may appear in white block areas (if any) in a visible light image.

The classifying module 430 may be configured to classify the pixels in an image into different categories. The different categories may at least include a first category corresponding to white points and a second category corresponding to non-white points.

The fusion module 440 may be configured to fuse the first image with the second image obtained by the obtaining module 410 to generate a fused image. In the fusion process, the fusion module 440 may combine relevant information of the first image and the second image into the fused image. In some embodiments, the fused image may be a color image with enhanced luminance and chrominance. In some embodiments, the fusion process may be performed in a pixel to pixel manner. A fusion operation may be performed between each pixel in the first image and a corresponding pixel in the second image. In such case, the information of a pixel in the first image may be combined with the information of a corresponding pixel in the second image to generate the information of a corresponding pixel in the fused image.

The modules in the processing device 120 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the obtaining module 410 and the pre-processing module 420 may be combined into a single module which may both obtain and pro-process the first image and the second light image. As another example, the obtaining module 410 may be divided into two units. A first unit may obtain the first image. A second unit may obtain the second image.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 120 may further include a storage module (not shown in FIG. 4). The storage module may be configured to store data generated during any process performed by any component of the processing device 120. As another example, each of components of the processing device 120 may correspond to a storage module, respectively. Additionally or alternatively, the components of the processing device 120 may share a common storage module.

FIG. 5 is a flowchart illustrating an exemplary process 500 for generating a fused image according to some embodiments of the present disclosure. In some embodiments, the process 500 may be implemented in the image fusion system 100 illustrated in FIG. 1. For example, the process 500 may be stored in a storage medium (e.g., the storage device 140, the storage 203, the memory 360, or the storage 390) as a form of instructions, and can be invoked and/or executed by the processing device 120 (e.g., the processor 210, the CPU 340, or one or more modules in the processing device 120 illustrated in FIG. 4). The operations of the illustrated process 500 presented below are intended to be illustrative. In some embodiments, the process 500 may be accomplished with one or more additional operations not described, and/or without one or more of the operations discussed. Additionally, the order of the operations of the process 500 as illustrated in FIG. 5 and described below is not intended to be limiting. In some embodiments, the process 500 may be performed to fuse different images to generate one or more fused images. In some embodiments, the processing device 120 may generate a plurality of fused images by repeating the process 500.

In 510, the obtaining module 410 may obtain a first image and a second image. The obtaining module 410 may obtain the first image and the second image from, for example, the image capturing device 110, or one or more storage device (e.g., the storage device 140, the storage 203 and/or the storage 390).

In some embodiments, the first image and the second image may be of different types. For example, the first image may be a visible light image, and the second image may be an infrared light image. In some embodiments, the first image and the second image may be of the same type. For example, both of the first image and the second image may be visible light images, and the first image may be captured under a larger quantity of light exposure than the second image.

The first image and the second image may be captured by different imaging channels. In some embodiments, the different imaging channels may be represented by different image capturing devices, such as a visible light camera and an infrared light camera. In some embodiments, the different imaging channels may be represented by different image sensors in a same image capturing device (e.g., the image capturing device 110), such as a visible light sensor and an infrared sensor. In some embodiments, the different imaging channels may be represented by different working states of an image capturing device (e.g., the image capturing device 110), such as a visible light capturing state and an infrared light capturing state. The image capturing device may alter its working state by at least adjusting or moving one or more light filters mounted within it. A specific light filter may only allow the light within a specific range to pass.

The first image and the second image may represent a same scene. For example, both of the first image and the second image may show a same object with the same surroundings. In some embodiments, the scene represented by the first image and the second image may be a static scene or a dynamic scene. For example, the first image (e.g., a visible light image) and the second image (e.g., an infrared light image) may both show a static scene of an elevator entrance when the elevator is in a standby state). As another example, the first image (e.g., a visible light image) and the second image (e.g., an infrared light image) may both show a dynamic scene of a parking lot exit with one or more vehicles exiting the parking lot. In some embodiments, the number of pixels in the first image and the number of pixels in the second image may be same or different. Each pixel in the first image may correspond to a pixel in the second image, and each pixel in the first image and its corresponding pixel in the second image may represent a same physical point in the scene.

In some embodiments, the first image and/or the second image may be represented in various formats. For example, the first image and/or the second image may be an RGB (red-green-blue) format image represented in RGB color space or a YUV (luminance and chrominance) format image represented in YUV color space. The RGB format image and the YUV format image may be converted to each other reciprocally. In some embodiments, the first image and the second image may be represented in a same format or different formats, according to different application scenarios.

In some embodiments, the first image and/or the second image may be a pre-processed image generated by the pre-processing module 420. Exemplary preprocessing may include reducing the noise by, for example, a filtering operation. The filtering operation may include a spatial filtering, a frequency domain filtering, or the like, or a combination thereof. The spatial filtering may include linear filtering (e.g., a mean filtering, a Gaussian filtering, a Wiener filtering) and non-linear filtering (e.g., a median filtering). Specifically, the first image and/or the second image may be the pre-processed image pre-processed by an enhanced time-domain noise reduction algorithm. The enhanced time-domain noise reduction algorithm may remove jittered color noises in the original image of the first image and/or the second image. The jittered color noises may be an abnormal color change caused by, for example, a hardware problem. Under low luminance environments, jittered color noises may appear in white block areas (if any) in a visible light image. A white block area may include a plurality of pixels whose R, G and B values are approximately equal to each other.

For brevity, assuming that the first image is generated by pre-processing a YUV format image that is one of a plurality of consecutive frame images of a video, the preprocessing performed by the enhanced time-domain noise reduction algorithm may be described as follows. By comparing adjacent frame images (e.g., one or more previous frame images adjacent to the YUV format image, one or more subsequent frame images adjacent to the YUV format image) with the YUV format image in a pixel to pixel manner, the changes of pixel values (e.g. Y, U and/or V values) between the YUV format image and its adjacent frame images may be recognized. If the change of a certain pixel value between the YUV format image and one of its adjacent frame images exceeds a threshold, the pixel in the YUV format image that corresponds to the certain pixel value may be regarded as a jittered color noise. Then, the first image may be generated by removing the jittered color noise in the YUV format image. In some embodiments, the threshold may be set to an extremely low value (e.g., a value approximately equal to zero), such that the jittered color noise may be effectively recognized and further removed, thereby reducing the interference of the jittered color noise in the white block area of the YUV format image.

In 520, the classifying module 430 may classify the pixels in the first image into different categories. The different categories may at least include a first category corresponding to white points and a second category corresponding to non-white points.

As used herein, a white point may be the point with the color of "white" in a color space. The white point may have various representations in different format images. For example, in an RGB format image, the white point may be the point whose R value, G value and B value are identical. As another example, in a YUV format image, the white point may be the point whose chromaticity coordinates are (⅓, ⅓) in the diagram of the CIE 1931 color space. For brevity, the description related to the white point may take the RGB format image as an example.

In some embodiments, the first category corresponding to white points may include the white points and the points approximate to the white points in the first image. The point approximate to the white point may be defined as the point whose R value, G value and B value are close to each other. As used herein, that two values are close to each other may indicate that the difference between the two values is smaller than a certain threshold. In some embodiments, the certain threshold may be a fixed value set by a user. In some embodiments, the certain threshold may be a variable, e.g., a fraction of one of the two values. The fraction may be 0.05, 0.1, 0.15, 0.2, 0.3, 0.4, etc. The second category corresponding to non-white points may include other points in the first image other than the white points and the points approximate to the white points. Specifically, the first category corresponding to white points and the second category corresponding to non-white points may exclude the points that are regarded as jittered color noises as described elsewhere in the present disclosure.

In 530, the fusion module 440 may fuse the first image with the second image to generate a fused image. In the fusion process, the fusion module 440 may combine relevant information of the first image and the second image into the fused image. In some embodiments, the fused image may be a color image with enhanced luminance and chrominance.

In some embodiments, the fusion process may be performed in a pixel to pixel manner. A fusion operation may be performed between each pixel in the first image and a corresponding pixel in the second image. In such case, the information of a pixel in the first image may be combined with the information of a corresponding pixel in the second image to generate the information of a corresponding pixel in the fused image. As used herein, the pixel in the first image and the corresponding pixel in the second image may represent the small physical points in the real world.

In some embodiments, the fusion associated with a pixel in the first category and the fusion associated with a pixel in the second category may be performed according to different fusion rules. For example, a pixel in the fused image that corresponds to the first category may be generated according to a first fusion rule. According to the first fusion rule, the fusion module 440 may calculate the chrominance information of the pixel in the fused image merely based on the information of the corresponding pixel in the first image (e.g., the chrominance information of the corresponding pixel in the first image). Another pixel in the fused image that corresponds to the second category may be generated according to a second fusion rule. According to the second fusion rule, the fusion module 440 may calculate the chrominance information of the another pixel in the fused image based on both of the information of the corresponding pixel in the first image (e.g., the chrominance information of the corresponding pixel in the first image) and the information of the corresponding pixel in the second image (e.g., the luminance information of the corresponding pixel in the second image). As used herein, the chrominance information of a pixel may be represented by a chrominance component (e.g., the UV component) of the pixel, and the luminance information of the pixel may be represented by a luminance component (e.g., the Y component) of the pixel.

Additionally or alternatively, the fusion module 440 may calculate the luminance information (e.g., the Y component) of the pixels in the fused image based on both of the information of the corresponding pixels in the first image (e.g., the luminance information of the corresponding pixels in the first image) and the information of the corresponding pixels in the second image (e.g., the luminance information of the corresponding pixels in the second image). More description regarding the fusion process may be found elsewhere in the present disclosure (e.g., FIG. 6 and the description thereof).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 510 and/or operation 520 may be performed by the image capturing device 110.

Figure 6:
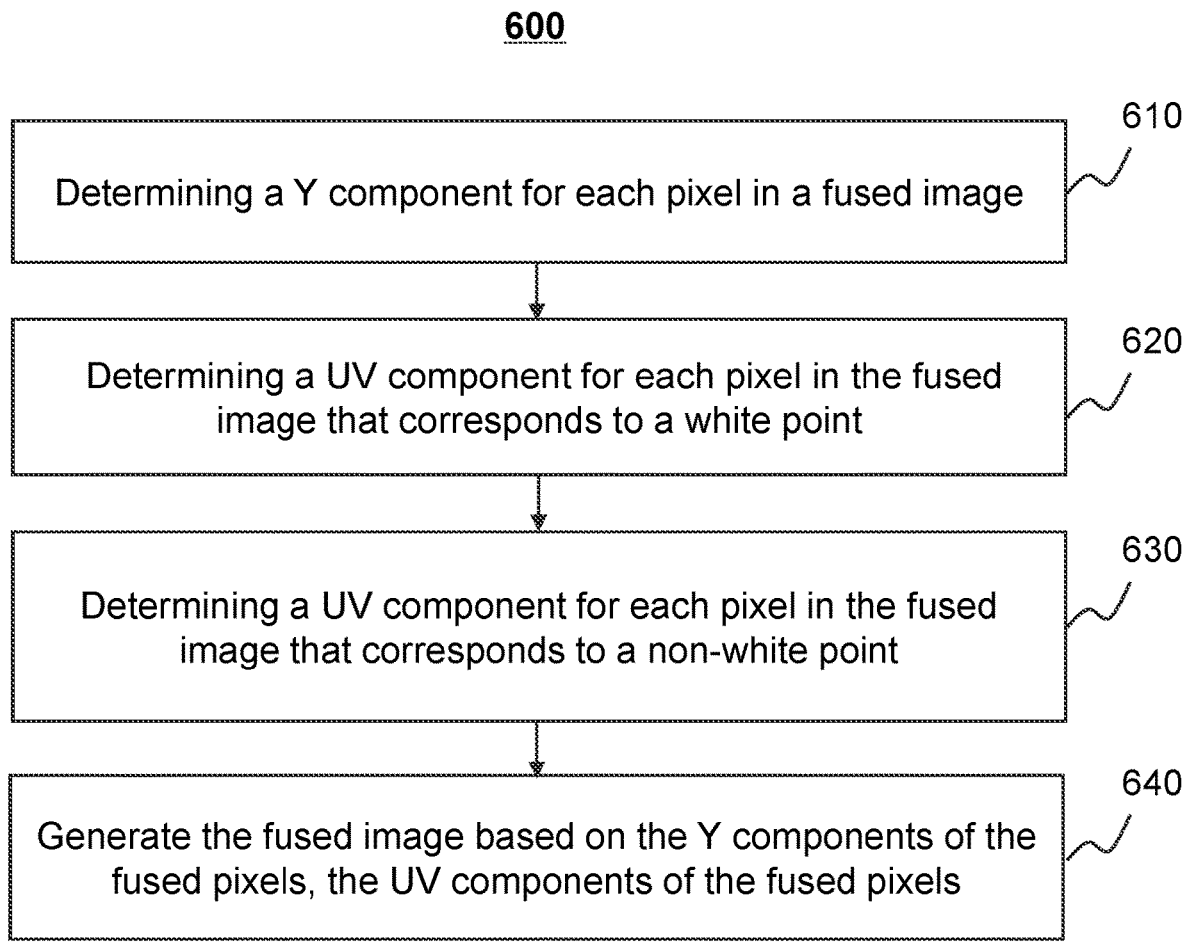
FIG. 6 is a flowchart illustrating an exemplary process for generating a fused image according to some embodiments of the present disclosure.

FIG. 6 is a flowchart illustrating an exemplary process for generating a fused image according to some embodiments of the present disclosure. In some embodiments, the process 600 may be implemented in the image fusion system 100 illustrated in FIG. 1. For example, the process 600 may be stored in a storage medium (e.g., the storage device 140, the storage 203, the memory 360, or the storage 390) as a form of instructions, and can be invoked and/or executed by the processing device 120 (e.g., the processor 201, the CPU 340, or one or more modules in the processing device 120 illustrated in FIG. 4). The operations of the illustrated process 600 presented below are intended to be illustrative. In some embodiments, the process 600 may be accomplished with one or more additional operations not described, and/or without one or more of the operations discussed. Additionally, the order of the operations of the process 600 as illustrated in FIG. 6 and described below is not intended to be limiting. In some embodiments, the operation 530 illustrated in FIG. 5 may be performed according to the process 600.

For brevity, the description of the generation of a fused image may take the YUV format images as an example. It should be noted that the description below is merely an example or implementation. For persons having ordinary skills in the art, the generation of the fused image in the present disclosure may also be applied with other format images, such as, RGB format images.

In 610, the fusion module 440 may determine a Y component for each pixel in a fused image. The Y component of a pixel may represent the luminance information of the pixel. For brevity, a pixel in the fused image may also be referred to as "a fused pixel".

In some embodiments, the Y component of a fused pixel may be determined based on the Y component of a first pixel in a first image and the Y component of a second pixel in a second image. In some embodiments, the first image and the second image described herein may be same as or similar to the first image and the second image described in FIG. 5, respectively. The first pixel in the first image, the second pixel in the second image, and the fused pixel in the fused image may correspond to each other and represent the same physical point in the real world.

For example, the Y component of the fused pixel may be determined as the larger one between the Y component of the first pixel and the Y component of the second pixel. As another example, the Y component of the fused pixel may be determined as the mean value of the Y component of the first pixel and the Y component of the second pixel. As still another example, the Y component of the fused pixel may be determined by multiplying the mean value of or the larger one between the Y component of the first pixel and the Y component of the second pixel with a luminance enhancement coefficient. The luminance enhancement coefficient may be used to enhance the luminance of the fused image or a part thereof. In some embodiments, the luminance enhancement coefficients corresponding to different fused pixels may be different. For example, the luminance enhancement coefficients corresponding to the fused pixels with different chrominance may be different. Specifically, the luminance enhancement coefficient corresponding to a red fused pixel may be greater than the luminance enhancement coefficient corresponding to a gray fused pixel. More description regarding the determination of the Y component of a fused pixel may be found elsewhere in the present disclosure (e.g., FIG. 7 and the description thereof).

In 620, the fusion module 440 may determine a UV component for each pixel in the fused image that corresponds to a white point. The UV component of a pixel may represent the chrominance information of the pixel. For brevity, a fused pixel corresponding to a white point may be referred to as "a first fused pixel". The first fused pixel may be the fused pixel whose corresponding pixel in the first image belongs to the category corresponding to white points. As described elsewhere in the present disclosure (e.g., the operation 520), the pixels in the first image may be classified into a first category corresponding to white points and a second category corresponding to non-white points. The first category corresponding to white points may include the white points and the points approximate to the white points in the first image. The second category corresponding to non-white points may include other points in the first image other than the white points and the points approximate to the white points.

In some embodiments, the UV component of a first fused pixel may be determined based on the UV component of the corresponding pixel in the first image according to a first fusion rule. For example, according to the first fusion rule, the UV component of the corresponding pixel in the first image may be directly designated as the UV component of the first fused pixel. As another example, according to the first fusion rule, the UV component of the first fused pixel may be determined by multiplying the UV component of the corresponding pixel in the first image with a scale factor. The scale factor may be a predetermined value set by a user.

In 630, the fusion module 440 may determine a UV component for each pixel in the fused image that corresponds to a non-white point. For brevity, a fused pixel corresponding to a non-white point may be referred to as "a second fused pixel". The second fused pixel may be the fused pixel whose corresponding pixel in the first image belongs to the category corresponding to non-white points.

In some embodiments, the UV component of the second fused pixel may be determined based on the UV component of the corresponding pixel in the first image and a chrominance enhancement coefficient according to a second fusion rule. According to the second fusion rule, the chrominance enhancement coefficient may be determined based on the luminance information (e.g., the Y component) of the second fused pixel and the luminance information (e.g., the Y component) of the corresponding pixel in the first image. For example, assuming that a pixel $C_1$ in the first image corresponds to a second fused pixel $C_3$ in the fused image, the Y component and the UV component of the pixel $C_1$ may be denoted as $Y_{C1}$ and $UV_{C1}$, respectively, and the Y component of the second fused pixel $C_3$ may be denoted as $Y_{C3}$. The fusion module 440 may calculate a value C based on $Y_{C3}$ and $Y_{C1}$ (e.g., the ratio of $Y_{C3}$ to $Y_{C1}$), and designate the value C as the chrominance enhancement coefficient. Then, a product of the UV component of the pixel $C_1$ (i.e., $UV_{C1}$) and the chrominance enhancement coefficient C may be calculated and the result may be further determined as the UV component of the second fused pixel $C_3$.

In 640, the fusion module 440 may generate the fused image based on the Y components of the fused pixels, the UV components of the fused pixels (including the UV components of the first fused pixels and the UV components of the second fused pixels).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, at least one of operations 610 to 640 may be performed by the image capturing device 110. As another example, operation 620 may be performed after operation 630, or operations 610 and 630 may be performed simultaneously.

Figure 7:
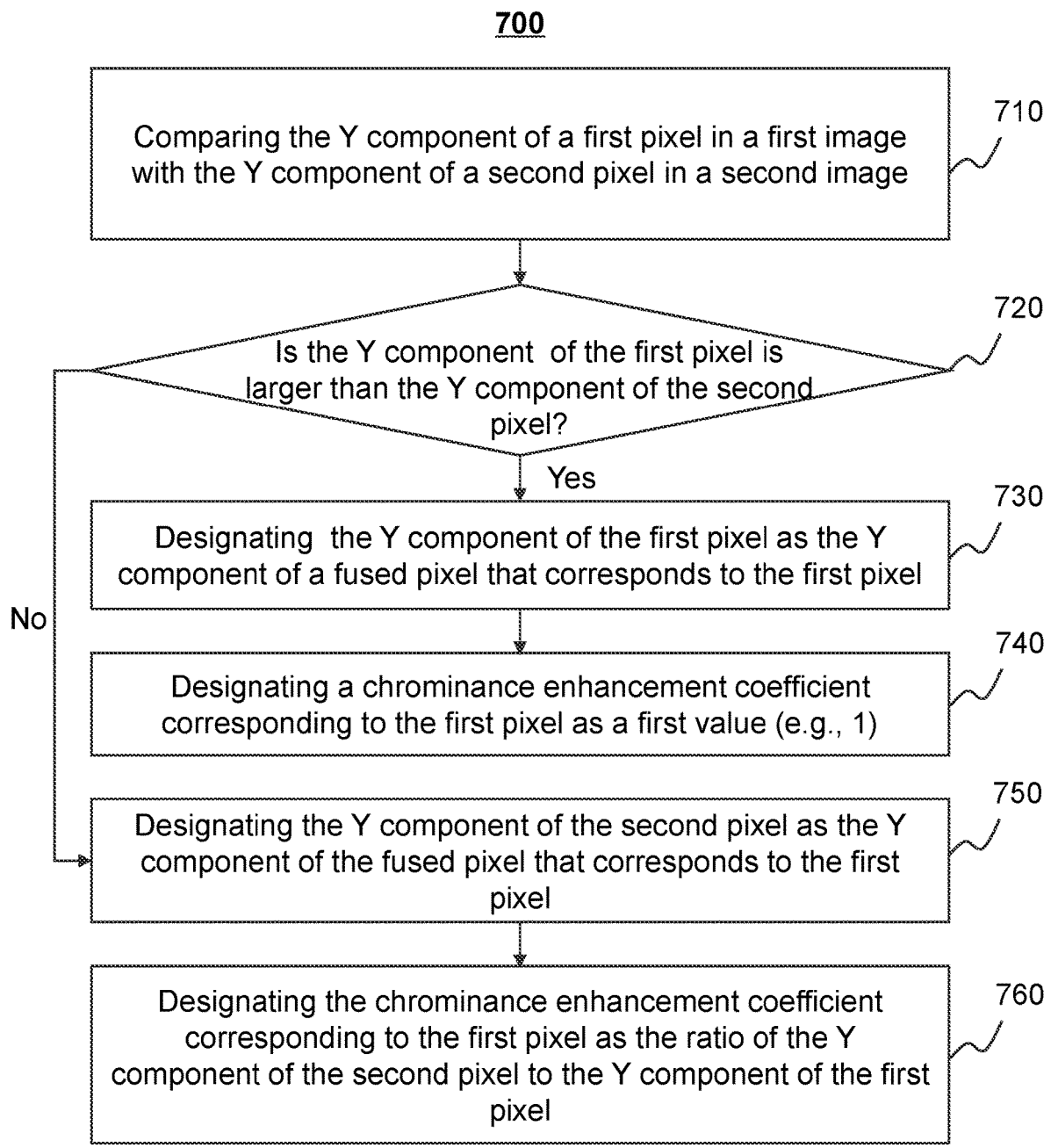
FIG. 7 is a flowchart illustrating an exemplary process for determining the Y component of a fused pixel according to some embodiments of the present disclosure.

FIG. 7 is a flowchart illustrating an exemplary process for determining the Y component of a fused pixel according to some embodiments of the present disclosure. In some embodiments, the process 700 may be implemented in the image fusion system 100 illustrated in FIG. 1. For example, the process 700 may be stored in a storage medium (e.g., the storage device 140, the storage 203, the memory 360, or the storage 390) as a form of instructions, and can be invoked and/or executed by the processing device 120 (e.g., the processor 210, the CPU 340, or one or more modules in the processing device 120 illustrated in FIG. 4). The operations of the illustrated process 700 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting. In some embodiments, operation 610 in FIG. 6 may be performed according to the process 700.

In 710, the fusion module 440 may compare the Y component of a first pixel in a first image with the Y component of a second pixel in a second image. In some embodiments, the first image and the second image may be same as or similar to the first image and the second image described in FIG. 5, respectively. The first pixel in the first image and the second pixel in the second image may correspond to each other and represent the same physical point in the real world.

In 720, the fusion module 440 may determine whether the Y component of the first pixel is larger than the Y component of the second pixel.

If the Y component of the first pixel is larger than the Y component of the second pixel, the fusion module 440 may proceed to operation 730. If the Y component of the first pixel is equal to or smaller than the Y component of the second pixel, the fusion module 440 may proceed to operation 750.

In 730, the fusion module 440 may designate the Y component of the first pixel as the Y component of a fused pixel that corresponds to the first pixel.

In 740, the fusion module 440 may designate a chrominance enhancement coefficient corresponding to the first pixel with a first value (e.g., 1). In some embodiments, the chrominance enhancement coefficient corresponding to the first pixel may be further used to calculate the chrominance information of the fused pixel that corresponds to the first pixel.

In 750, the fusion module 440 may designate the Y component of the second pixel as the Y component of the fused pixel that corresponds to the first pixel.

In 760, the fusion module 440 may designate the chrominance enhancement coefficient corresponding to the first pixel with the ratio of the Y component of the second pixel to the Y component of the first pixel.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 8:
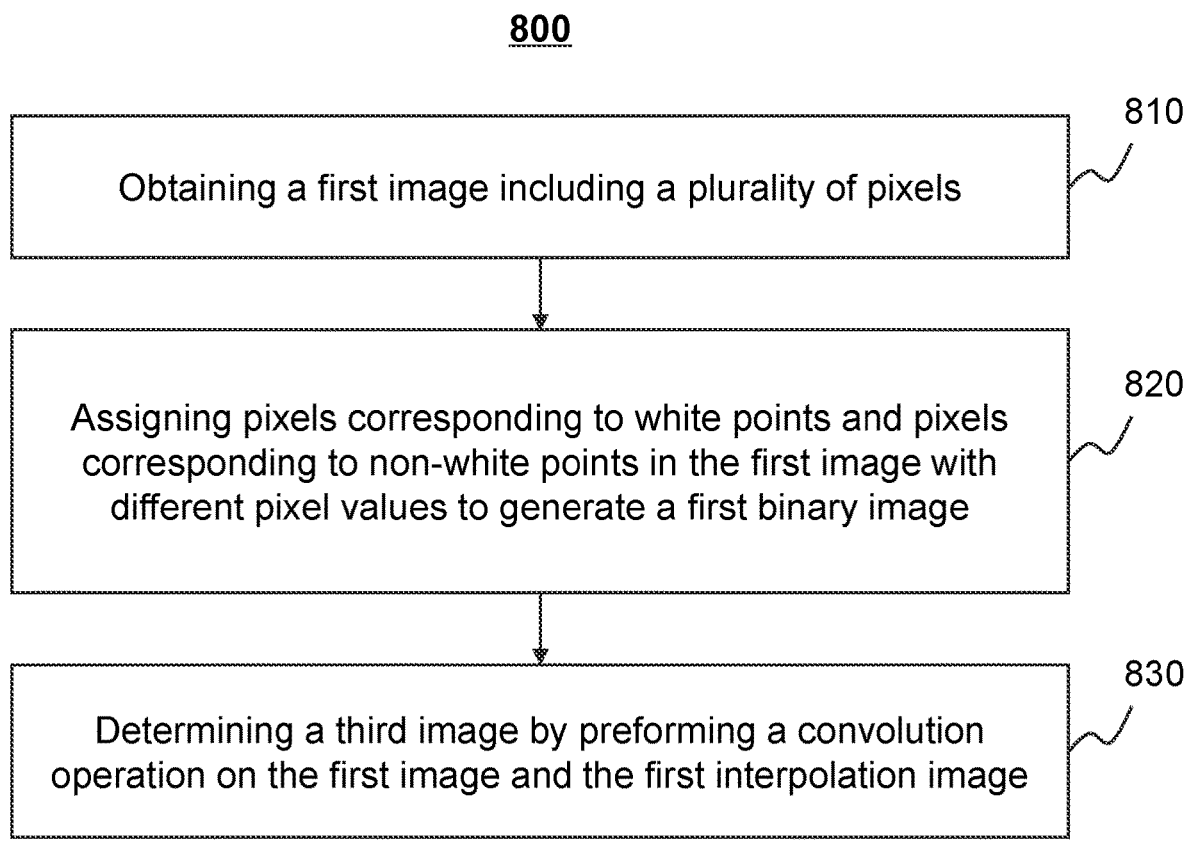
FIG. 8 is a flowchart illustrating an exemplary process for determining the UV component of a fused image corresponding to a white point according to some embodiments of the present disclosure.

FIG. 8 is a flowchart illustrating an exemplary process for determining the UV component of a fused image corresponding to a white point according to some embodiments of the present disclosure. In some embodiments, the process 800 may be implemented in the image fusion system 100 illustrated in FIG. 1. For example, the process 800 may be stored in a storage medium (e.g., the storage device 140, the storage 203, the memory 360, or the storage 390) as a form of instructions, and can be invoked and/or executed by the processing device 120 (e.g., the processor 210, the CPU 340, or one or more modules in the processing device 120 illustrated in FIG. 4). The operations of the illustrated process 800 presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting. In some embodiments, operation 620 in FIG. 6 may be performed according to the process 800.

In 810, the fusion module 440 may obtain a first image including a plurality of pixels. In some embodiments, the first image described herein may be same as or similar to the first image described in FIG. 5. As described elsewhere in the present disclosure, the plurality of pixels in the first image may be classified into a first category corresponding to white points and a second category corresponding to non-white points.

In 820, the fusion module 440 may generate a first binary image based on the first image. For example, the fusion module 440 may assign the pixels belonging to the first category corresponding to white points with a first pixel value (e.g. "1"), and assign the pixels belonging to the second category corresponding to non-white points with a second pixel value (e.g. "0").

In 830, the fusion module 440 may determine a third image by preforming a convolution operation on the first image and the first binary image.

In some embodiments, the convolution operation may include calculating the product of the UV component of a pixel in the first image and the binary value of a corresponding pixel in the first binary image. In the case that the binary value of the first binary image is "1" or "0", after the convolution operation, the UV components of the pixels in the third image that correspond to white points may be same as that of the first image, while the UV components of the pixels in the third image that correspond to non-white points may be set to "0". The third image may be further fused with one or more other images to generate the fused image. In some embodiments, the UV components of the pixels in the third image that correspond to white points may be directly used as the UV components of the corresponding pixels in the fused image.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 9:
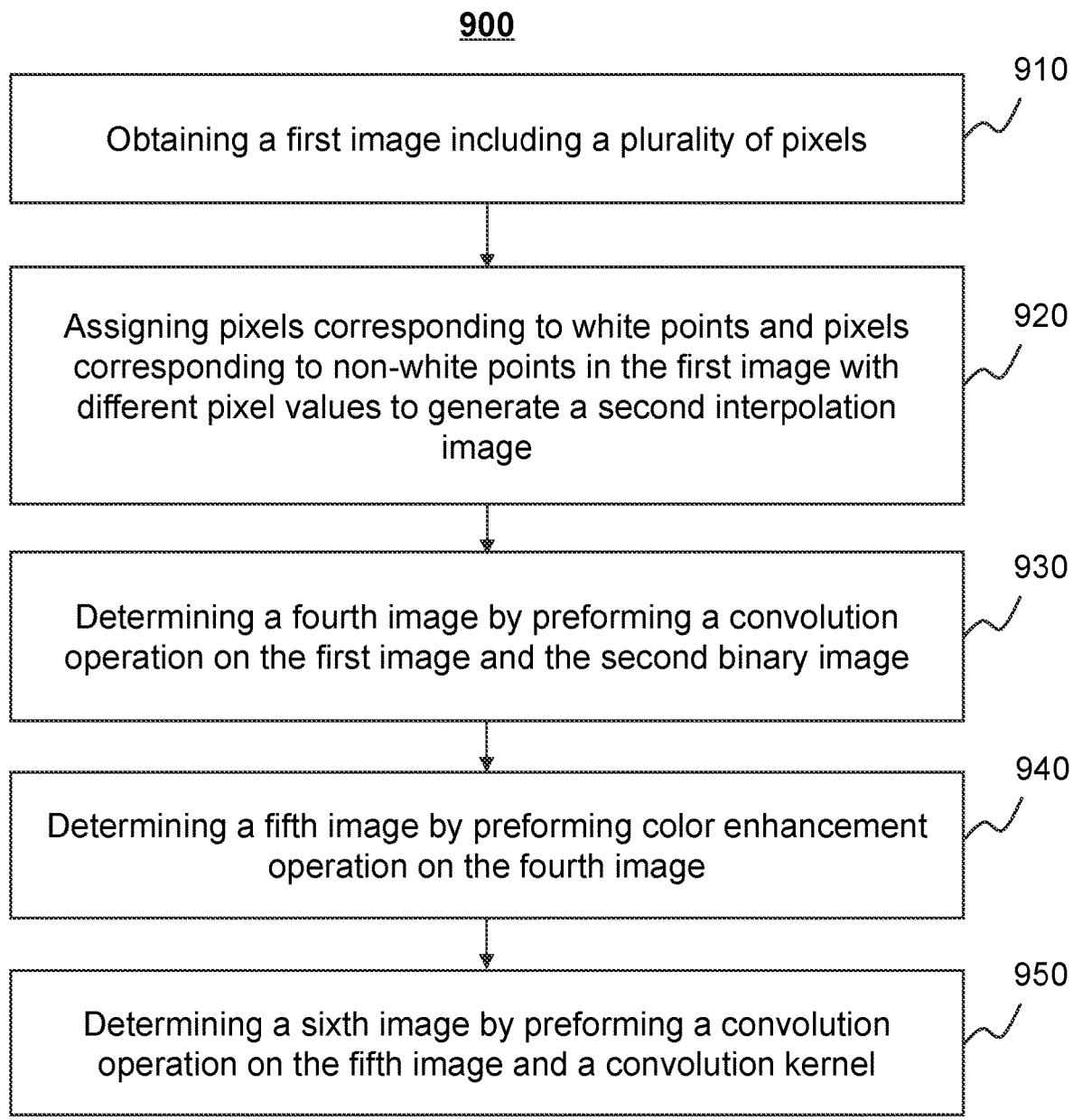
FIG. 9 is a flowchart illustrating an exemplary process for determining the UV component of a fused image corresponding to a non-white point according to some embodiments of the present disclosure.

FIG. 9 is a flowchart illustrating an exemplary process for determining the UV component of a fused image corresponding to a non-white point according to some embodiments of the present disclosure. In some embodiments, the process 900 may be implemented in the image fusion system 100 illustrated in FIG. 1. For example, the process 900 may be stored in a storage medium (e.g., the storage device 140, the storage 203, the memory 360, or the storage 390) as a form of instructions, and can be invoked and/or executed by the processing device 120 (e.g., the processor 210, the CPU 340, or one or more modules in the processing device 120 illustrated in FIG. 4). The operations of the illustrated process 900 presented below are intended to be illustrative. In some embodiments, the process 800 may be accomplished with one or more additional operations not described, and/or without one or more of the operations discussed. Additionally, the order of the operations of the process 900 as illustrated in FIG. 9 and described below is not intended to be limiting. In some embodiments the process 900 may be performed to determine the UV components of the fused pixels corresponding to non-white points. Merely as an example, the process 900 may include performing a color enhancement operation and a color smoothing operation to determine the UV components of the fused pixels corresponding to non-white points in the fused image. In some embodiments, operation 630 in FIG. 6 may be performed according to the process 900.

In 910, the fusion module 440 may obtain a first image including a plurality of pixels. In some embodiments, the first image described herein may be same as or similar to the first image described in FIG. 5 or FIG. 8. As described elsewhere in the present disclosure, the plurality of pixels in the first image may be classified into a first category corresponding to white points and a second category corresponding to non-white points.

In 920, the fusion module 440 may generate a second binary image based on the first image. For example, the fusion module 440 may assign the pixels belonging to the first category corresponding to white points with a third pixel value (e.g. "0"), and assign the pixels belonging to the second category corresponding to non-white points with a fourth pixel value (e.g. "1").

In 930, the fusion module 440 may determine a fourth image by preforming a convolution operation on the first image and the second binary image.

In some embodiments, the convolution operation may include calculating the product of the UV component of a pixel in the first image and the binary value of a corresponding pixel in the second binary image. In the case that the binary value of the second binary image is "1" or "0", after the convolution operation, the UV components of the pixels in the fourth image that correspond to non-white points may be same as that of the first image, while the UV components of the pixels in the fourth image that correspond to white points may be set to "0".

In 940, the fusion module 440 may determine a fifth image by preforming a color enhancement operation on the fourth image. The color enhancement operation may enhance chrominance of the fourth image by increasing at least part of the UV components of the fourth image. For example, the fusion module 440 may calculate the product of the UV component of a pixel corresponding to a non-white point in the fourth image and a chrominance enhancement coefficient, and determine the product result as the UV component of a corresponding pixel in the fifth image. Description regarding the chrominance enhancement coefficient may be found elsewhere in the present disclosure (e.g., in FIG. 6 and the description thereof), and is not repeated herein.

In 950, the fusion module 440 may perform a convolution operation on the fifth image and a convolution kernel. In some embodiment, the convolution kernel may be predetermined. For example, the convolution kernel may be a matrix denoted as $$\begin{bmatrix} 0 & 1 & 0 \\ 1 & 8 & 1 \\ 0 & 1 & 0 \end{bmatrix},$$

which is used to smoothen the color distribution (i.e., the distribution of the UV components of the pixels) in the fifth image.

Further, the smoothed fifth image may be further fused with one or more other images to generate the fused image. For example, by combining the UV components of the pixels in the smoothed fifth image that correspond to non-white points and the UV components of the pixels in the third image that correspond to white points described in FIG. 8, the fusion module 440 may determine the UV components of the fused pixels in the fused image. Then, the UV components of the fused pixels and the luminance components of the fused pixels (e.g., as described in FIG. 6) may be further combined to generate the fused image.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device. Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:
at least one storage medium including a set of instructions; and
at least one processor in communication with the at least one storage medium, wherein when executing the set of instructions, the at least one processor is directed to cause the system to:
obtain a first image including a plurality of first pixels, the first image being generated by a first imaging channel;
obtain a second image including a plurality of second pixels, the second image being generated by a second imaging channel distinct from the first imaging channel, each of the plurality of second pixels corresponding to one of the plurality of first pixels;
classify the plurality of first pixels into different categories, the different categories at least including a first category and a second category, wherein the first category at least includes a white point or a point approximate to the white point and the second category at least includes a non-white point; and
fuse the first image with the second image based on a fusion operation between each of the plurality of first pixels and its corresponding second pixel to generate a fused image, wherein the fusion operation associated with a first pixel belonging to the first category and the fusion operation associated with a first pixel belonging to the second category are performed according to different fusion rules, wherein to perform the fusion operation associated with the first pixel belonging to the second category, the at least one processor is directed to cause the system to:
determine a chrominance component of the first pixel belonging to the second category;
determine a chrominance enhancement coefficient; and
determine a chrominance component of a fourth pixel in the fused image based on the chrominance component of the first pixel belonging to the second category and the chrominance enhancement coefficient.

2. The system of claim 1, wherein the first imaging channel is configured to capture a visible light image, and the second imaging channel is configured to capture an infrared light image.

3. The system of claim 1, wherein to perform the fusion operation associated with the first pixel belonging to the first category, the at least one processor is directed to cause the system to:
determine a chrominance component of the first pixel belonging to the first category; and
designate the chrominance component of the first pixel belonging to the first category as a chrominance component of a third pixel in the fused image.

4. The system of claim 3, wherein the at least one processor is directed to cause the system to:
generate a first binary image based on the first pixels belonging to the first category and the first pixels belonging to the second category; and
perform a convolution operation on the first image and the first binary image such that the chrominance component of the first pixel belonging to the first category remains unchanged.

5. The system of claim 1, wherein the chrominance enhancement coefficient is determined based on a luminance component of the first pixel belonging to the second category and a luminance component of a second pixel that corresponds to the first pixel belonging to the second category.

6. The system of claim 1, wherein the at least one processor is directed to cause the system to:
generate a second binary image based on the first pixels belonging to the first category and the first pixels belonging to the second category; and
perform a convolution operation on the first image and the second binary image such that the chrominance component of the first pixel belonging to the second category remains unchanged.

7. The system of claim 1, wherein to perform the fusion operation associated with the first pixel belonging to the first category, the at least one processor is directed to cause the system to:
determine a luminance of the first pixel belonging to the first category and a luminance of a second pixel that corresponds to the first pixel belonging to the first category; and
determine a luminance component of a fifth pixel in the fused image based on a comparison result between the luminance of the first pixel belonging to the first category and the luminance of the second pixel that corresponds to the first pixel belonging to the first category.

8. A method for image fusion, implemented on a computing device including at least one processor and at least one storage medium, the method comprising:
obtaining a first image including a plurality of first pixels, the first image being generated by a first imaging channel;
obtaining a second image including a plurality of second pixels, the second image being generated by a second imaging channel distinct from the first imaging channel, each of the plurality of second pixels corresponding to one of the plurality of first pixels;
classifying the plurality of first pixels into different categories, the different categories at least including a first category and a second category, wherein the first category at least includes a white point or a point approximate to the white point and the second category at least includes a non-white point; and fusing the first image with the second image based on a fusion operation between each of the plurality of first pixels and its corresponding second pixel to generate a fused image, wherein the fusion operation associated with a first pixel belonging to the first category and the fusion operation associated with a first pixel belonging to the second category are performed according to different fusion rules, wherein the performing the fusion operation associated with the first pixel belonging to the second category comprising:
determining a chrominance component of the first pixel belonging to the second category;
determining a chrominance enhancement coefficient; and
determining a chrominance component of a fourth pixel in the fused image based on the chrominance component of the first pixel belonging to the second category and the chrominance enhancement coefficient.

9. The method of claim 8, wherein the performing the fusion operation associated with the first pixel belonging to the first category, comprising:
determining a chrominance component of the first pixel belonging to the first category; and designating the chrominance component of the first pixel belonging to the first category as a chrominance component of a third pixel in the fused image.

10. The method of claim 9, further comprising:
generating a first binary image based on the first pixels belonging to the first category and the first pixels belonging to the second category; and
performing a convolution operation on the first image and the first binary image such that the chrominance component of the first pixel belonging to the first category remains unchanged.

11. The method of claim 8, wherein the chrominance enhancement coefficient is determined based on a luminance component of the first pixel belonging to the second category and a luminance component of a second pixel that corresponds to the first pixel belonging to the second category.

12. The method of claim 8, further comprising:
generating a second binary image based on the first pixels belonging to the first category and the first pixels belonging to the second category; and
performing a convolution operation on the first image and the second binary image such that the chrominance component of the first pixel belonging to the second category remains unchanged.

13. The method of claim 8, wherein the performing the fusion operation associated with the first pixel belonging to the first category, comprising:
determining a luminance of the first pixel belonging to the first category and a luminance of a second pixel that corresponds to the first pixel belonging to the first category; and
determining a luminance component of a fifth pixel in the fused image based on a comparison result between the luminance of the first pixel belonging to the first category and the luminance of the second pixel that corresponds to the first pixel belonging to the first category.

14. A non-transitory computer readable medium, comprising executable instructions that, when executed by at least one processor, directs the at least one processor to perform a method for image fusion, the method comprising:
obtaining a first image including a plurality of first pixels, the first image being generated by a first imaging channel;
obtaining a second image including a plurality of second pixels, the second image being generated by a second imaging channel distinct from the first imaging channel, each of the plurality of second pixels corresponding to one of the plurality of first pixels;
classifying the plurality of first pixels into different categories, the different categories at least including a first category and a second category, wherein the first category at least includes a white point or a point approximate to the white point and the second category at least includes a non-white point; and
fusing the first image with the second image based on a fusion operation between each of the plurality of first pixels and its corresponding second pixel to generate a fused image, wherein the fusion operation associated with a first pixel belonging to the first category and the fusion operation associated with a first pixel belonging to the second category are performed according to different fusion rules, wherein the performing the fusion operation associated with the first pixel belonging to the second category comprising:
determining a chrominance component of the first pixel belonging to the second category;
determining a chrominance enhancement coefficient; and
determining a chrominance component of a fourth pixel in the fused image based on the chrominance component of the first pixel belonging to the second category and the chrominance enhancement coefficient.

* * * * *